United States Patent [19]

Cakebread et al.

[11] 4,212,006
[45] Jul. 8, 1980

[54] CRANE LOAD ALARM WITH COMPENSATION FOR DIRECTION OF ROPE MOVEMENT

[75] Inventors: William A. Cakebread; Graham R. Pryke, both of St. Leonards-on-Sea, England

[73] Assignee: B & A Engineering Company Ltd., Hastings, England

[21] Appl. No.: 7,354

[22] Filed: Jan. 26, 1979

[30] Foreign Application Priority Data

Jan. 26, 1978 [GB] United Kingdom ................ 3259/78

[51] Int. Cl.² ............................................. G08B 21/00
[52] U.S. Cl. .................................... 340/685; 212/154; 212/155
[58] Field of Search ............ 340/685; 212/39 R, 39 A

[56] References Cited

U.S. PATENT DOCUMENTS

| | | | |
|---|---|---|---|
| 3,826,321 | 7/1974 | Rigney et al. | 340/685 |
| 3,866,200 | 2/1975 | Paredes et al. | 340/685 |
| 4,029,213 | 6/1977 | Thompson et al. | 340/685 |
| 4,052,602 | 10/1977 | Horn et al. | 340/685 |
| 4,098,410 | 7/1978 | Nixon et al. | 340/685 |

*Primary Examiner*—Glen R. Swann, III
*Attorney, Agent, or Firm*—Wenderoth, Lind & Ponack

[57] ABSTRACT

A load weighing device for cranes comprises a dynamometer whose output is modified according to the direction of rope motion therethrough. Also described is a safe load indicator for generating a signal representative of the maximum safe load which the crane can carry, which signal is compared with the output signal of the dynamometer to provide an indication when the maximum safe load is exceeded. Further described is a device for sensing the orientation of the crane and for modifying the relation between the dynamometer and safe load indicator output signals in accordance with the direction and degree of slope of the crane during use.

20 Claims, 10 Drawing Figures

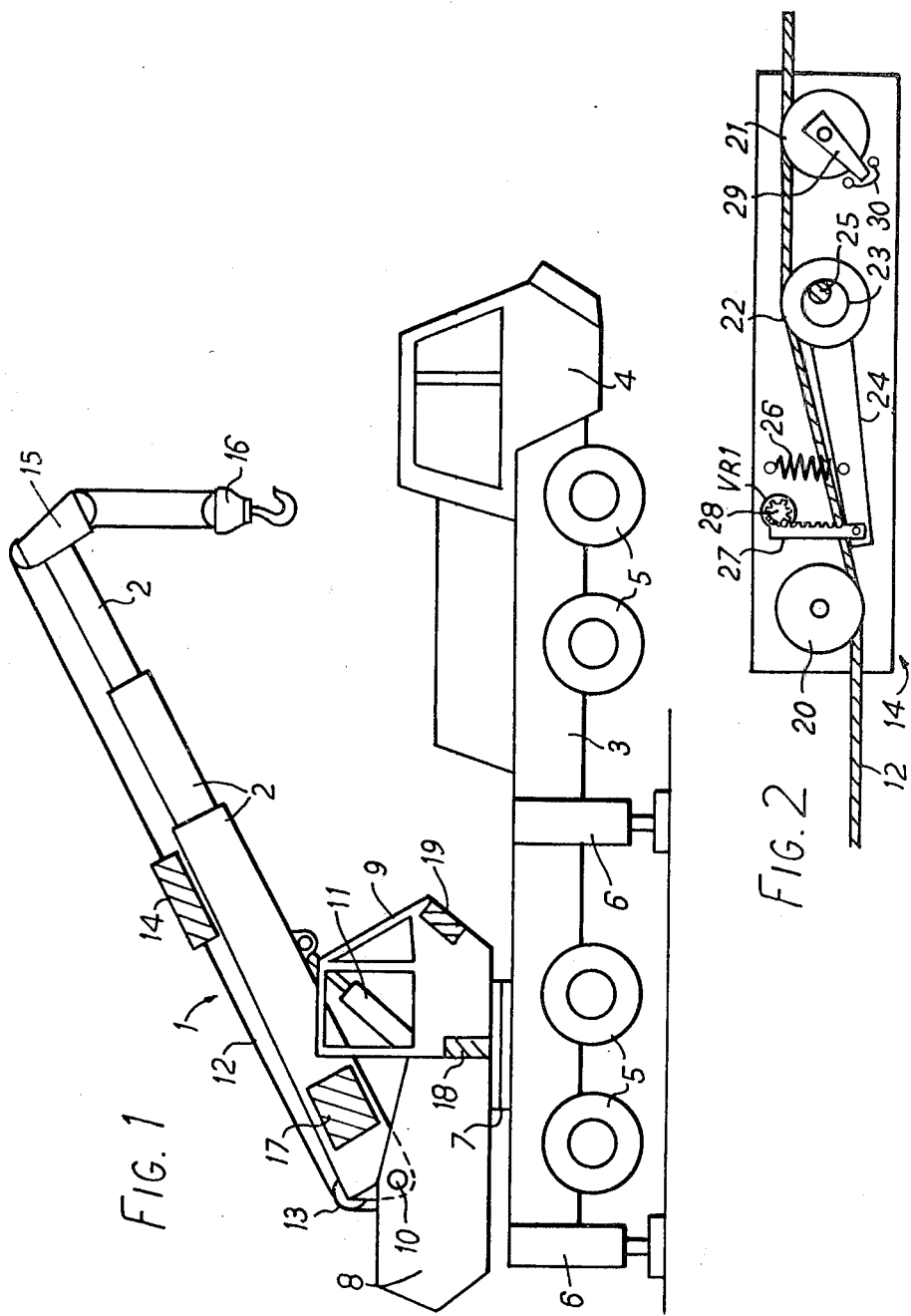

CRANE LOAD ALARM WITH COMPENSATION FOR DIRECTION OF ROPE MOVEMENT

BACKGROUND OF THE INVENTION

This invention relates to load weighing devices for cranes.

Load weighing devices are intended to measure the weight being carried at a particular instant by the hook of a crane, so that the driver of the crane is able to ensure that the crane is not being overloaded. Such devices generally include a dynamometer which is interposed in the crane rope leading to the hook and which is operable to measure the tension in the rope caused by the load on the hook, and a safe load indicator which is operable to compute the angle of the jib or, in variable-length jib cranes, both the angle and length of the jib in order to supply a signal indicative of the maximum load which the crane can safely carry under the computed conditions of jib angle and length. The signal from the dynamometer is compared either manually or, preferably, automatically with the signal representing the maximum load to ensure that the maximum load is not exceeded. A disadvantage of existing designs is that, due to frictional effects in the various sheaves and to rope bending losses, the dynamometer gives a different reading according to the direction of rope motion.

BRIEF DESCRIPTION OF THE DRAWING

According to the invention, this disadvantage is sought to be overcome by providing a rope direction sensing element which is operable to modify the output of the dynamometer in accordance with the direction of rope motion.

The output signal of the dynamometer may be simply mechanical, or may be hydraulic or electrical.

Figure 3:
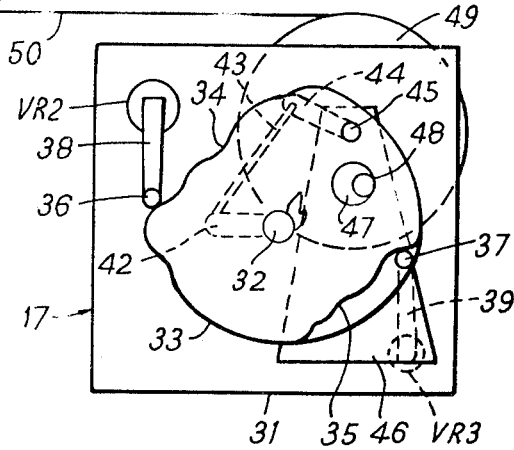

In one type of dynamometer the reading of hook load is given in the form of an electrical signal, and the rope direction sensing element is operable to modify an appropriate parameter of this electrical signal in accordance with the direction of rope motion. In a preferred embodiment of the invention, this parameter is voltage amplitude, and the rope direction sensing element includes a switch which is automatically switchable, in accordance with the direction of rope motion, to add or subtract electrical resistance from the dynamometer output signal path.

The dynamometer output signal can be used directly, in conjunction with electric meters or the like, to give a direct indication to the crane driver of the load being carried, or may be compared with a reference signal representing the maximum safe load which the crane can carry under the particular conditions of use to provide a warning and alarm automatically when that load is approached and exceeded.

Thus far, it has been assumed that the number of "falls", i.e. the number of vertical parts of ropes between the top pulley system of the jib and the hook pulley block, has been fixed so that the relation of the tension in the rope as between the jib top pulley and the hoisting drum (in which rope the dynamometer is normally situated) to the load on the hook is known, thus enabling the electrical output signal from the dynamometer to be calibrated. In many instances, however, crane operators find it desirable or necessary to alter the number of falls in accordance with the particular task the crane has to perform. For example a larger number of falls will increase the load that may be carried by the crane, at the expense of a slowing down of lifting speed. Clearly if the number of falls varies, the relation between the hook load and the tension in the rope passing through the dynamometer will also vary. Thus, in a preferred embodiment of the invention, means are provided for selectively modifying the electrical output signal of the dynamometer in accordance with the number of falls of the rope.

The dynamometer may thus generate an electrical signal which is compensated both for changes in the direction of rope motion and for changes in the number of falls. The load weighing device of the invention preferably, however, further includes a safe load indicator for cranes, which indicator comprises a cam box housing a cam having a follower connected to rotate the spindle of a potentiometer so that the reference electrical output signal from the potentiometer is representative, by its amplitude, of the shape of the cam, and means for causing said cam to rotate with movement of the jib of the crane.

The output signal of the potentiometer is thus representative of the angle of the crane jib, which parameter is the most important in determining the maximum load that a fixed-length jib crane can carry. For variable length jib cranes, it is usually necessary additionally to take into account the length of the jib at any particular instant and, for this purpose, a computation of jib length and jib angle may be used to rotate the potentiometer.

In an alternative safe load indicator for variable-length jib cranes, the cam box houses a number of cams mounted axially adjacent to each other. A separate cam follower and potentiometer is associated with each cam and the desired electrical output signal obtained by mechanical or electrical switching according to jib length. Alternatively the cam may be elongate in the direction of its axis of rotation, and means are provided for moving the cam follower or cam parallel to this axis in accordance with the jib length. The cam profile is thus cut in three dimensions: angularly and axially to represent two of the three functions of jib length, jib angle or a computation of the two, and radially to represent the maximum safe load.

In all the above methods, the total angle of rotation of the cam may be less than 90°, so it is possible to provide a number of cam profiles on each cam, individual profiles representing different situations, for example different crane duties. Examples of the various possible crane duties are given below:

1. Mobile crane with or without outriggers.
2. The use or otherwise of fixed extensions to extend the length of a non-telescopic crane jib.
3. The use or otherwise of a "fly jib". A fly jib is a fixed length jib extension extending at an angle to the main jib. Often head pulleys are available both at the top of the fly jib and at the top of the main part of the jib and the operator therefore has a choice of which head pulleys to use.
4. The use of fly jibs having different lengths and/or angles with respect to the main jib.
5. The angular position of the crane jib about a vertical axis. This is a particular problem in mobile cranes where the crane is significantly less stable when lifting to one side than when the jib is substantially in line with the wheels.
6. In telescopic cranes, the existence or otherwise of a manually inserted jib insert to extend the jib length.

A separate potentiometer and cam follower is associated with the profile corresponding to each crane duty, and the desired electrical output signal may be obtained by mechanical or electrical switching. In a preferred embodiment of the invention to be described hereinafter, two such cam profiles are provided for use in a safe load indicator for a mobile crane. One of the profiles is selected when the crane's outriggers are in use, the other when they are not.

One disadvantage of certain designs of safe load indicator arises from their inability to sense and compensate for the change in moment and loadings imposed when the crane is standing on a slope. It will be appreciated that when a crane is standing on a slope with the jib on the downhill side of the crane there is a tendency for the load to swing out to a greater radius than the radius when the crane is standing on level ground, thus increasing the moment tending to overturn the crane and giving rise to higher stresses in the jib or crane structure. Conversely with the jib over the uphill side of the crane there is a tendency for the load to swing in towards the crane to a smaller radius than the correct radius and this may result in the crane jib becoming unstable in a backwards direction, i.e. down the slope, if the safe load indicator should allow the safe load to be increased. In a preferred embodiment of the invention therefore, the load weighing device includes means for sensing the orientation of the crane and for reducing the safe load reading given by the indicator when the crane is inclined with the jib on the downhill side, but maintaining the safe load reading when the crane is inclined with the jib on the uphill side. The sensing means may be operable to modify the output signal of the safe load indicator potentiometer, or to modify the output signal of the dynamometer. Alternatively, the sensing means may be "built in" to the safe load indicator, and mechanically adjust the drive to the cam in accordance with the orientation of the crane, as will be described below.

DESCRIPTION OF THE PREFERRED EMBODIMENTS

Figure 4:
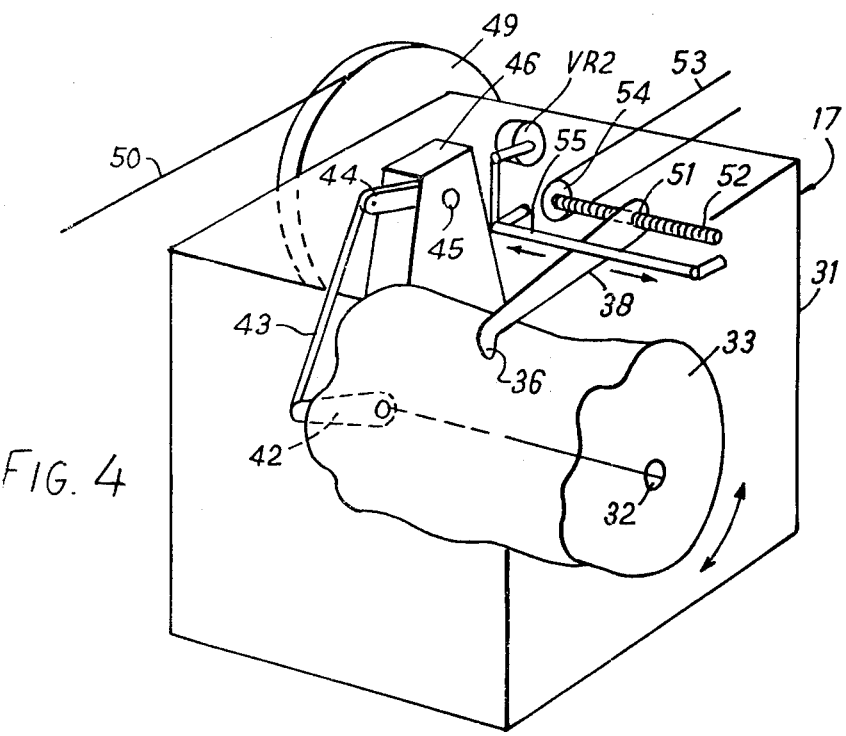
Figure 5:
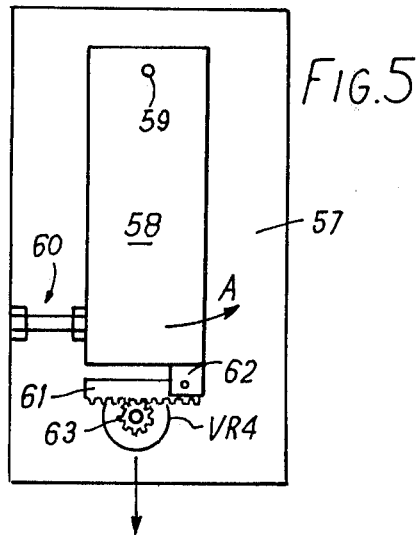
Figure 6:
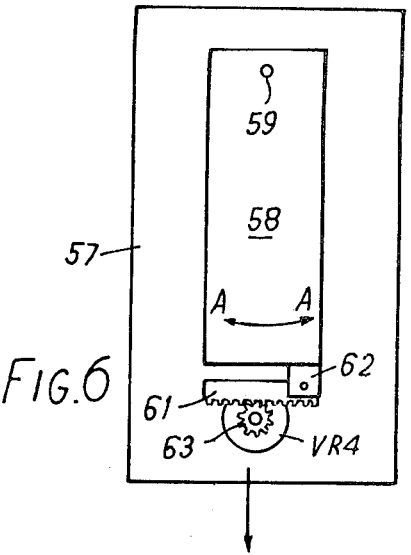
Figure 7:
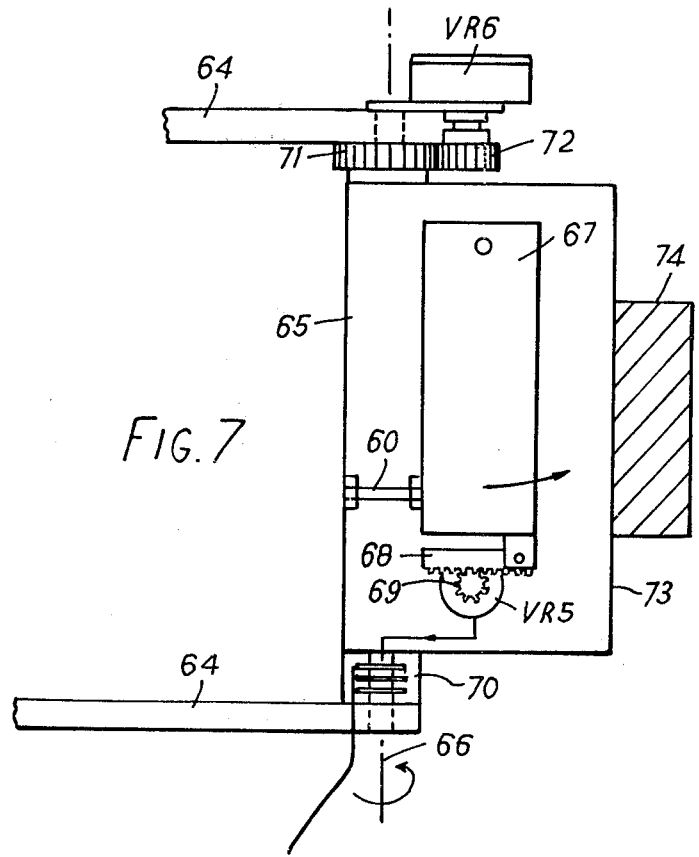
Figure 8:
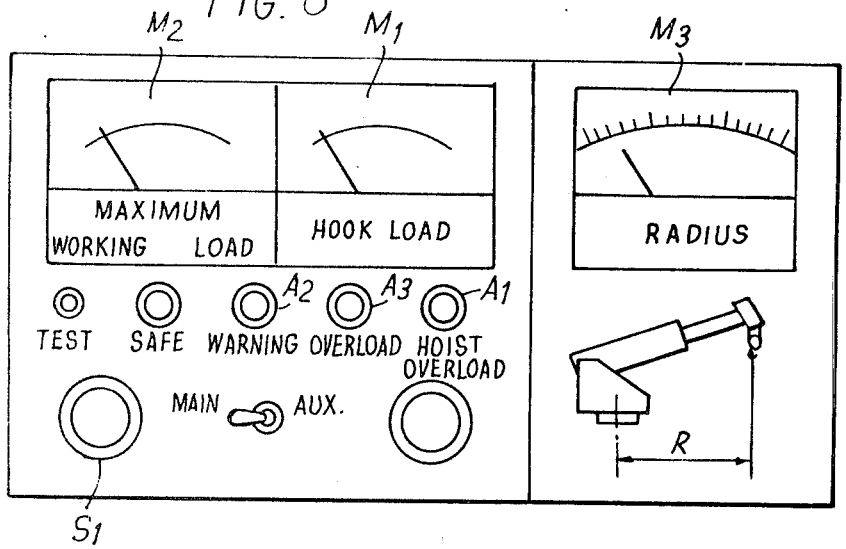
Figure 9:
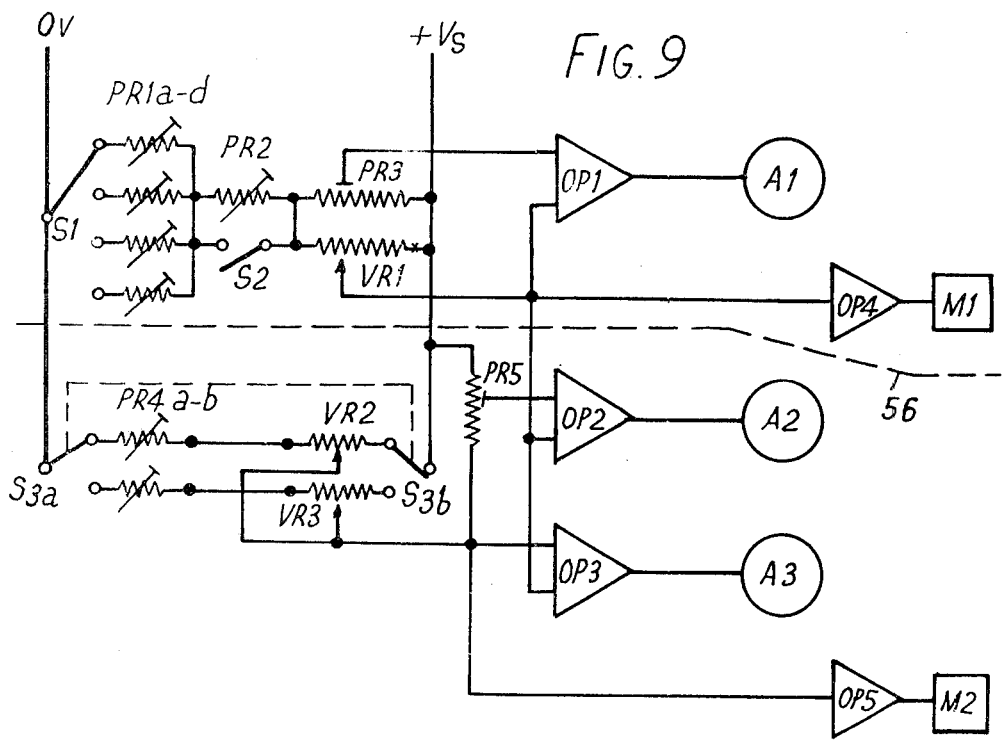
Figure 10:
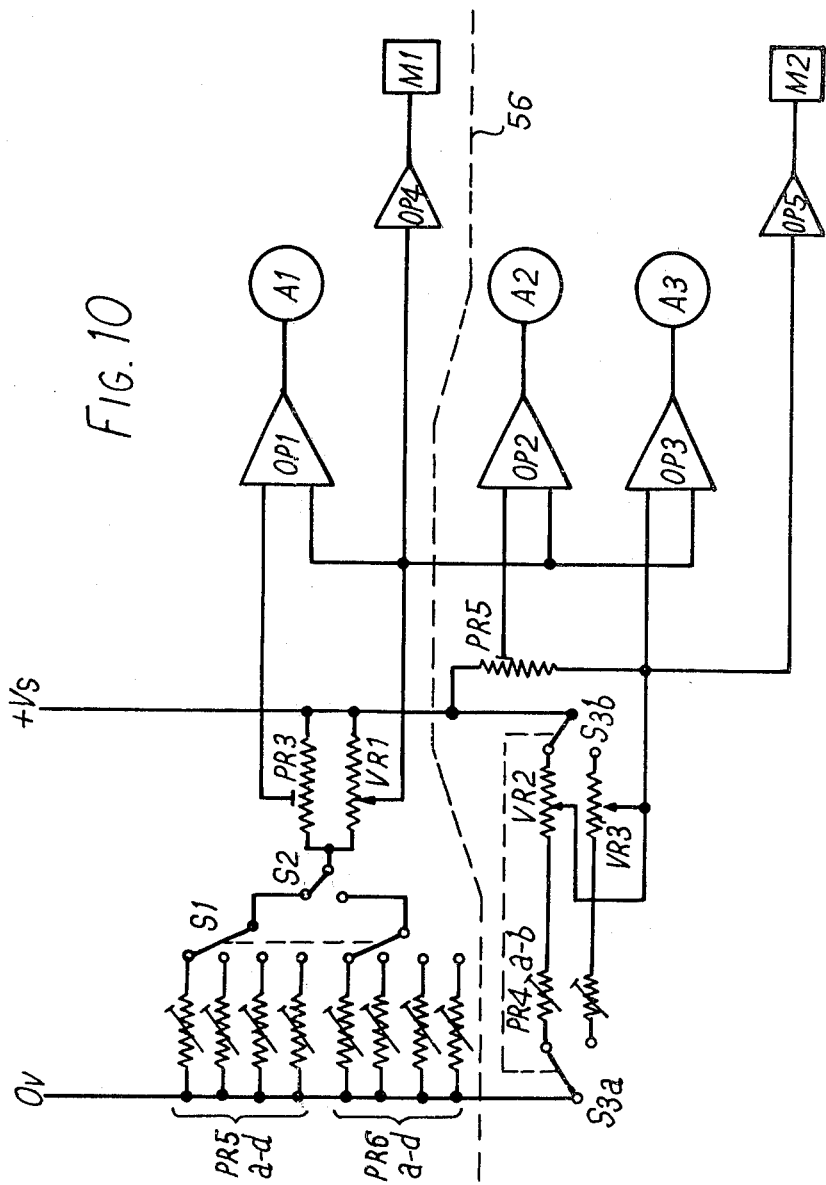

In order that the invention may be better understood, several embodiments thereof will now be described by way of typical example only and with reference to the accompanying drawings in which:

FIG. 1 is a diagrammatic side elevation of a mobile crane equipped with a load weighing device in accordance with the invention;

FIG. 2 is a diagrammatic cut-away side view of the dynamometer of FIG. 1;

FIG. 3 is a diagrammatic cut-away side view of one embodiment of a load-law cam box forming part of the load weighing device of FIG. 1;

FIG. 4 is a diagrammatic perspective view of another embodiment of a load-law cam box forming part of the load weighing device of FIG. 1;

FIGS. 5, 6 and 7 are diagrammatic views of three embodiments or orientation sensing means for use with the crane of FIG. 1;

FIG. 8 is a view of the front panel of the crane driver's display unit shown in FIG. 1;

FIG. 9 is a block diagram of one embodiment of the electronic circuitry associated with the load weighing device of this invention; and FIG. 10 is a block diagram of a second embodiment of the electronic circuitry of FIG. 9.

Referring to FIG. 1, the load weighing device of this invention is shown fitted to a mobile crane 1 having a telescopic jib 2, chassis 3, driving cab 4, and road wheels 5. As shown, outriggers 6 are extended, raising the road wheels 5 off the ground. The crane is pivotally mounted on the chassis 3 at a slewing centre 7.

The crane comprises a lower portion 8 housing the hoisting drum (not shown) and a cab 9 for the crane driver. The jib 2 of the crane is pivoted about a horizontal axis 10 in a conventional manner. The jib is raised and lowered by means of a hydraulic ram 11 acting between the lower portion 8 and the jib 2. The hoisting rope 12, after leaving the hoisting drum, passes over a lower pulley 13, through a dynamometer 14, and over an upper pulley system 15. The rope then extends down to the hook pulley block 16 in a number of falls, selected in accordance with the task the crane is to carry out.

The block 17 shows the position of the cam box, which houses the cams defining the various load laws for the crane. The block 18 shows the position of the control box which houses the electronic circuitry associated with the dynamometer 14 and the cam box 17. The various meter readings, switches and warning lights are mounted on a display panel 19 in front of the crane driver.

Referring now to FIG. 2, the dynamometer 14 is shown comprising three freely rotatable sheaves 20, 21 and 22 over which the hoisting rope 12 passes. It should be understood that the outer sheave or sheaves 20 and/or 21 may form a part of the existing jib or crane structure. Sheaves 20 and 21 are rotatable about fixed axes, whereas sheave 22 is mounted on an axle 23 fixed to a lever 24. The lever 24 is rotatable about a fixed axis 25 spaced by a short distance from the centre line of the axle 23. Lever 24 is biassed in a clockwise direction by a coil spring 26, which in turn biasses the sheave 22 into the path of the rope 12. The angular position of lever 24 is thus dependent upon the tension in the hoist rope 21. The remote end of lever 24 is pivotally connected to rack gear 27 which acts on a small pinion 28 to rotate the spindle of a potentiometer VR1 in accordance with angular movement of the lever. The potentiometer VR1 is connected by cable to electronic circuitry, to be described in detail hereinafter, within the control box 18 (see FIG. 1). Potentiometer VR1 is provided with slotted mounting attachments so that the whole body of the potentiometer can be rotated, relative to the dynamometer, to enable adjustments to be made.

The sheave 21 is equipped with an arm 29 rotatably connected to the sheave 21 by means of a slipping clutch (not shown). The arm 29 is moveable between the limits of a pair of stops 30. Thus when the rope 12 is moving, for example, from left to right in FIG. 2, the sheave 21 is rotated clockwise and carries with it the arm 29 until the latter becomes biassed against the upper stop 30. Associated with at least one of the stops 30 is a respective electrical switch (not shown) which is operated when the arm becomes biassed against its stop 30. This switch is connected via cables to electronic circuitry within the control box 18 and is thus indicative, by the manner in which it is switched at any particular instant, of the direction of motion of the hoist rope 12 at that instant.

Although shown mounted on sheave 21, the arm may equally be mounted on sheave 20 or indeed sheave 22.

Where a crane is equipped with a fly jib, a separate dynamometer 14 may be associated with both the hoist rope leading over the fly jib and with the hoist rope leading over the pulley system at the top of the main jib.

Referring now to FIG. 3, there is shown a first embodiment of the cam box 17 of FIG. 1. The cam box comprises a housing 31, on which is rotatably mounted about an axis 32, a cam 33 having two separate spaced, circumferential profiles 34, 35. A respective cam follower 36, 37 is associated with each profile, and is biassed against the cam periphery by means not shown. Each cam follower is attached by means of a respective arm 38, 39 to the spindle of a respective potentiometer VR2, VR3.

The cam 33 is rotated by means of an arm 42 which is connected by a lever 43 to a further arm 44, which latter is mounted to rotate about an axis 45 which is fixed with respect to the housing 31. Also pivotally mounted to rotate about axis 45 is a pendulum 46 which, under the influence of gravity, takes up a position substantially as shown. The pendulum 46 and arm 44 are connected together for rotation. The pendulum is equipped with an aperture 47 through which extends a pin 48. The pin 48 which, as is clear from the drawing, is of considerably smaller diameter than the aperture 47 is mounted on a pulley 49. The pulley 49 is rotatable about the axis 45, and is caused to move by means such as a wire or rod 50 with rotation of the jib 2 about the axis 10 (FIG. 1). The angular position of the pulley 49 is thus indicative of the jib angle.

If the crane is positioned on level ground with the jib in the lowered (horizontal) position, the pendulum 46 takes up the position shown in FIG. 3, with the pin 48 against the right hand edge of the aperture 47. As the jib is raised the wire 50 is moved to the right thus rotating pulley 49 clockwise. The pin 48 is thus moved to the left and permits the pendulum, and hence cam 33, to rotate clockwise relative to housing 31. The two cam followers 36, 37 thus move over their respective cam profiles to thereby operate their respective potentiometers VR2, VR3, as described above. The resistance of the two potentiometers at any one instant is thus representative of the jib angle at that instant. In a fixed-length jib crane, jib angle is the most important parameter affecting the maximum safe working load of the crane. Thus, the resistance of the potentiometers VR2, VR3 can, by suitable cutting of the profiles 34, 35 be made to represent the maximum safe working load of the crane for different jib angles.

The potentiometers are connected by cable to electronic circuitry contained within the control box 18. In fact, as will be described later, only one of the potentiometers VR2, VR3 is in circuit at any one time, and the cam profiles 34, 35 are cut in such a way that the resistance of the potentiometers VR2 and VR3 respectively represents the maximum safe working load of the crane with and without the outriggers 6 in position. Clearly the maximum safe working load will be considerably lower when the outriggers 6 are not fitted. In an embodiment of the invention (not shown) the housing contains a plurality of cams 33, each cut to represent at least two, but preferably four, separate cam profiles to represent load laws for a plurality of different crane duties. Examples of the many different crane duties, leading to different load laws, are given above. Each of the cams 33 is mounted about the axis 32 and may be driven by the pulley 49. It may be that selected cams will require to be driven by, for example, a computation of jib angle and jib length, rather than just jib angle and, it will be clear that this would be easy to arrange.

If the crane is used on sloping ground, the jib will not be horizontal in its lowest position, and the cam box 17 will accordingly be turned anticlockwise or clockwise from the position shown in FIG. 3 according to whether the jib is facing uphill or downhill. If the jib is facing uphill, the cam box 17 is turned anticlockwise, and the operation of the device is unaffected.

However, if the jib faces downhill, the cam box 17 is turned clockwise whilst the pendulum 46 remains stationary under the influence of gravity so that, in the lowest position of the jib, the pin 48 moves towards the other side of the aperture 47 and takes up a position spaced from the right-hand wall of the aperture by an amount dependent on the angle of tilt of the crane. If now the jib is raised, the cam box 17 is turned anticlockwise whilst the pendulum 46 remains stationary under the influence of gravity and the pin 48 (and the pulley 49) similarly remain stationary, being driven relative to the cam box 17 by rotation of the jib. Hence the cam 33 is rotated by the pendulum 46 and not by the pin 48. Thus the resistance reading of the potentiometer is as if the jib were at a smaller than actual angle, due to the clearance between pin 48 and pendulum 46. Hence the maximum safe working load is reduced when the crane is tilted with the jib facing downhill.

The cam box described in relation to FIG. 3 is only useable for fixed-length jib cranes, or in variable-length jib cranes in which the maximum safe working load is quoted only in terms of jib angle. It if is desired to use the cam box of FIG. 3 with a variable length jib crane of the type in which the maximum safe working load is quoted in terms of jib angle and jib length then it is necessary to cause rotation of the pulley 49 to be dependent not only on jib angle, but on jib length as well. A device producing a suitable mechanical computation of jib angle and jib length is described in British Patent Specification 980,132.

Referring now to FIG. 4, there is shown a second embodiment of a cam box 17. Since the construction is similar in many respects to that of FIG. 3, identical reference numerals have been used, where appropriate, and the following explanation highlights the differences between the two embodiments. Although only one cam profile 34 and associated potentiometer VR2 are shown in FIG. 4, it is to be understood that two (or more) could be used, as in FIG. 3.

In the construction of FIG. 4, the cam 33 is axially elongate so that it can separately represent three independent items of information. The profile obtained when moving angularly represents, for example, the maximum safe working load with change of jib angle;; the profile obtained when moving axially—i.e. parallel to axis 32, for example, represents the maximum safe working load with change of jib length. Angular movement of the cam follower 36 over the cam has already been fully described in relation to FIG. 3 and the arrangement, including the lost motion connection with the pendulum 46 is identical.

The axial movement of the cam follower 36 is achieved by providing the arm 38 with a threaded aperture 51 which is threaded onto a threaded shaft 52 so that arm 38 pivots about the shaft. The shaft 52 is rotated via a rope 53 and pulley 54 in response to jib extension. Thus the axial position of the cam follower 36 is dependent upon jib length.

Angular movement of arm 38 is transmitted by a suitable sliding connection 55 to the spindle of potentiometer VR2. Thus the resistance of potentiometer VR2 is dependent both upon jib angle and jib length.

In the cam box shown in FIGs. 3 and 4, a pendulum 46 is provided for sensing the orientation of the crane and manipulating the mechanical connection between the pulley 49 and the cam or cams 33 as a result. Three further devices for sensing orientation are shown in FIGS. 5, 6 and 7 to which reference will now be made. The devices shown in FIGS. 5, 6 or 7 may be used with a cam box of the type shown in FIGS. 3 or 4, but without the pendulum arrangement, to modify the electrical output signals from the potentiometers VR2 and VR3. Alternatively, the devices can be used to modify the electrical output signal of the dynamometer potentiometer VR1, or to give a direct slope reading on a visual display. It will thus be seen that the devices shown in FIGS. 5, 6 and 7 can be used in cranes not fitted with a cam box.

Referring firstly to FIG. 5, the orientation sensing device comprises a backplate 57 which is fixed to the superstructure of the crane in a direction such that the plane of the plate is parallel with the longitudinal (front to rear) axis of the crane. A pendulum 58 is pivotably attached to the back plate 57 at point 59 and an adjustable backstop 60 prevents clockwise movement of the pendulum 58 further than the position shown. A toothed rack gear 61 is pivotally attached to a short extension 62 of the pendulum 58 and is arranged to bear against a gear wheel 63 mounted on the spindle of a potentiometer VR4. The device is positioned such that the backstop 60 is on the rear side of the pendulum 58. Thus, if the crane is parked facing down a slope (i.e. with the front of the crane lower than the rear) the pendulum 58, which will tend to maintain its vertical orientation, will rotate anticlockwise in the direction of arrow A with respect to the backplate by an amount dependent upon the angle of the slope. The potentiometer VR4 will thus be rotated via gears 61 and 63, by a corresponding amount, and will provide a corresponding electrical output signal. On the other hand, if the crane is parked facing up a slope, than the pendulum 58 will not rotate from the position shown, and will rest instead against the backstop. This prevents the device from falsely uprating the crane by indicating that a higher than normal load can be carried when the crane is facing uphill.

The electrical output signal from potentiometer VR4 may be used directly to indicate visually the degree of slope of the crane when parked on a hill, or may be used to automatically modify the electrical output from dynamometer potentiometer VR1 or cam box potentiometer VR2 or VR3 to lower the indicated maximum safe load when the crane is parked downhill. When the crane is on level ground, or is parked facing uphill, then the output signals of potentiometers VR1 or VR2/3 remain unmodified.

The device shown in FIG. 6 is identical to that shown in FIG. 5, except that the backstop is absent. The pendulum 58 is thus free to tilt both clockwise and anticlockwise with respect to the backplate 57 from the position shown. The backplate of the device shown in FIG. 6 is mounted on the crane superstructure at right angles to the main longitudinal axis of the crane and is thus able, by the same technique as is described above, to provide an electrical output signal from potentiometer VR4 which is indicative of the angle of transverse tilting of the crane. As before, the electrical output signal may be used directly to provide a visual indication of the direction and degree of lateral tilting of the crane, or may be used to automatically modify the outputs of potentiometers VR1 or VR2/3 to lower the indicated maximum safe load reading by an appropriate amount, depending on the degree of tilting.

In practice both the devices of FIGS. 5 and 6 may be used on a single crane to obtain complete compensation for tilting of the crane in any direction.

FIG. 7 shows a device which is able to sense both the direction and the degree of the maximum slope. The device comprises a pair of mounting brackets 64 attached to the crane superstructure. A movable backplate 65 is rotatably mounted between brackets 64 about a vertical axis 66. A pendulum 67, rack gear 68, gear 69 and potentiometer VR5 are arranged on the backplate 65 in a similar manner to that described above with reference to FIG. 5. The electrical output of the potentiometer VR5 is taken by way of three slip rings 70. A pair of gears 71, 72 transmit rotation of the backplate 65 about its vertical axis to a further potentiometer VR6 which latter thus indicates the angular position of the backplate about the axis 66.

It will be seen that the result of eccentrically mounting the backplate 65 about the axis 66 causes the backplate to tend to rotate, as the crane tilts, such that the side 73 of the backplate faces down the slope. This effect may be enhanced by an additional weight 74. The tilt of the pendulum 67 with respect to the backplate indicates the degree of tilt in the direction which the backplate is facing at any particular moment. Thus, since the backplate will always tend to rotate so that it is facing down the steepest slope, the electrical output of potentiometer VR5 indicates the degree of maximum slope. The output of potentiometer VR6, on the other hand, indicates the direction of maximum slope and can be used to provide a visual indication of this.

The output of potentiometer VR5 can be used directly to provide a visual indication of maximum slope on a 360° basis, or can be used, as before, to modify the electrical output signals of potentiometers VR1 or VR2/VR3.

Referring now to FIGS. 8 and 9 there is shown, in FIG. 9, one embodiment of an electric circuit for processing the information provided by the potentiometers VR1, VR2 and VR3. The dotted line 56 divides the circuit into two separable sections: the upper section is the circuit for processing the signal from the dynamometer 14, and thus forms part of the load weighing device; the lower section is the circuit for processing the signal from the cam box of FIG. 3 or FIG. 4.

The electrical circuit comprises a source Vs of stabilised voltage. A resistive potential divider is connected across the source Vs and comprises series connected potentiometer VR1 (contained within dynamometer 14), preset resistor PR2 and a selected one of present resistors PR1 a to d. The resistors PR1 a to d are selected by a switch S1 on the driver's control panel, shown in FIG. 8. It will be seen that the value of the particular resistor PR1 a to d which is selected will determine the voltage applied across the potentiometer VR1, and hence the voltage on the slider of the potentiometer. The switch S1 is thus used to adjust the voltage across VR1 in dependence on the number of falls of the hoisting rope between the upper pulley system 15 and the hook pulley block 16.

A further switch S2 is connected to selectively short out the resistor PR2. This switch is operated by movement of the arm 29 in the dynamometer 14 and is thus either on or off depending upon the direction of rope motion through the dynamometer. It will be seen that operation of the switch S2 will alter the voltage applied across the potentiometer VR1 by a preset amount so that account can be taken of the direction of rope motion.

The voltage across potentiometer VR1 thus takes into account the number of falls of the hoisting rope, and the direction of motion of the hoisting rope. As described in detail above, the position of the slider of potentiometer VR1 is dependent upon the tension in the hoisting rope passing through the dynamometer 14. Hence the voltage at the slider of potentiometer VR1 is representative of the load being carried by the crane hook. This voltage may be used directly or via an amplifier OP4 to deflect an analogue meter M1 on the driver's display panel, which meter thus directly indicates hook load. Meter M1, or indeed any of the meters shown in FIG. 8 may alternatively be digital display units or strip bar indicators.

A preset potentiometer PR3 is connected in parallel with potentiometer VR1 and is adjusted so that the voltage on its slider is repesentative of the maximum permissible rope load for the particular conditions (number of falls: direction or rope motion) being encountered at the time. This voltage is then compared with the voltage at the slider of potentiometer VR1 in a voltage comparator OP1 and an alarm light A1, or other warning, is given when the latter exceeds the former. The light A1 thus indicates to the crane driver that the maximum permissible rope load has been exceeded. This may or may not be greater than the maximum safe working load referred to previously.

Also connected across the stabilised supply source Vs is a selected one of two further resistive potential dividers each comprising one of potentiometers VR2, VR3 (within the cam box) and an associated series-connected preset resistor PR4 a, b. The required potential divider is selected either manually or automatically by means of a ganged switch S3a, b in accordance with whether the outriggers 6 (FIG. 1) are, or are not, in position.

Each of the present resistors PR4a and PR4b may be replaced by a plurality of present resistors (not shown), a selected one of which is switched into circuit by means of a multi-way switch. By this means it will be possible to change the resistance of PR4a and PR4b, in steps, to thereby electrically alter the weighting of the electrical outputs of respective potentiometers VR2 and VR3. This provides a convenient way of adapting the device for different crane duties without the necessity for a large number of different can profiles. For example, the cam profile as between the crane operating off the main jib and the crane operating off a removable fly jib is the same shape, but the cam is of a different size. Thus, adjustment of the device to cope with both these duties can be achieved either by the use of two cam profiles, as described in relation to FIGS. 3 and 4, or by the use of a plurality of switched resistors to replace the present resistors PR4a and PR4b, as described above.

It will be seen from the circuit and from the description of FIGS. 3 and 4 that the voltage at the slider of the selected potentiometer VR2 or VR3 is dependent upon either jib angle alone or, for some cranes, a computation of jib angle and jib length, and therefore can be made to represent the maximum safe working load for those particular settings of jib angle and length. The voltage at the slider of potentiometer VR2 or VR3 is displayed directly or via an operational amplifier OP5 on a meter M2 on the driver's display panel which meter thus directly indicates the maximum safe working load.

A voltage comparator OP3 is connected so as to compare the voltage at the slider of potentiometer VR1 with that at the slider of the selected potentiometer VR2 or VR3 to operate a warning lamp A3, or other audible or visual warning, when the former exceeds the latter. The lamp A3 thus warns the driver that the maximum safe working load of the crane is being exceeded.

A preset potentiometer PR5 is connected to tap off a preset portion of the voltage between the +Vs terminal of the supply and the voltage on the slider of the selected potentiometer VR2 or VR3. This tapped-off voltage is passed to one input of a voltage comparator OP2 in which it is compared with the voltage of the slider of potentiometer VR1. The potentiometer PR5 is preset to actuate a warning light A2 or other alarm when the voltage at the slider of VR1 exceeds a predetermined percentage, for example 90%, of the voltage at the slider of the selected potentiometer VR2 or VR3. This latter is thus a warning to the driver tht the maximum safe load is almost reached.

Referring now to FIG. 10, there is shown a circuit similar to that of FIG. 9, but in which the circuit of the load weighing device has been altered. The "falls" switch S1 is now a two pole ganged switch, from which one gang only is selected by the switch S2, which is now a change-over switch instead of a simple on-off device, as before. Thus, at any one time, one resistor only out of the two sets of present resistors PR5 a to d and PR6 a to d is selected for series connection to the potentiometer VR1. Operation of the circuit is otherwise the same as the described in relation to FIG. 9.

In both the embodiments of FIGS. 9 and 10, a normally-on push button switch may be inserted at the position X, in series with the potentiometer VR1. This switch temporarily disconnects the supply to potentiometer VR1 thus simulating a fault condition, and may be used to test the circuit.

For some applications a meter indication of working radius R may be required (see FIG. 8). Working radius is the horizontal distance between the crane slewing centre 7 and the perpendicular through the hook and is dependent both on jib length and jib angle. On fixed length jib cranes, a meter M3 provided for this purpose can monitor the voltage at the slider of an additional potentiometer (not shown) located in the cam box of FIG. 3 or FIG. 4. This additional potentiometer may be driven either directly by the pulley 49, or alternatively by an extra cam follower and cam (also not shown) having an appropriate law profile. On variable length jib cranes, the meter M3 monitors the voltage at the slider of an additonal potentiometer (not shown), driven from the output of a computation device such as that described in British Patent Specification 980,132 referred to above.

We claim:

1. A load weighing device for cranes, said device comprising a dynamometer interposed in the crane rope which is operable to produce an output signal indicative of the tension in the rope caused by a load on the crane hook, a rope direction sensing element for sensing the direction of rope motion through the dynamometer and means for modifying the dynamometer output signal in accordance with the direction of rope motion as sensed by said direction sensing element.

2. A load weighing device as claimed in claim 1 wherein the output signal of the dynamometer is an electrical signal.

3. A load weighing device as claimed in claim 2 wherein the modifying means includes a resistive device through which the electrical output signal of the dynamometer is caused to pass, the arrangement being such that the resistance of said resistive device can be varied between one of two values in accordance with the direction of rope motion.

4. A load weighing device as claimed in claim 3 wherein the modifying means includes a switch which is operated in accordance with the direction of rope motion to alter the resistance of the resistive device.

5. A load weighing device as claimed in claim 4 wherein the rope direction sensing element includes a pulley over which the crane rope passes and a slipping clutch operably connected with said pulley for mechanically operating said switch, the arrangement being such that the slipping clutch takes up one of two positions in accordance with the direction of rotation of the pulley.

6. A load weighing device as claimed in claim 5 wherein said modifying means comprises a resistor and said switch connected in parallel, such that the switch can selectively short out said resistor in accordance with the direction of rope motion.

7. A load weighing device as claimed in claim 2 further including means for selectively modifying the output signal of the dynamometer in accordance with the number of falls of the crane rope.

8. A load weighing device as claimed in claim 7 wherein said selectively modifying means comprises a plurality of different-value resistors, and switch means for selecting one of said resistors such that the electrical output signal of the dynamometer passes through said one resistor.

9. A load weighing device as claimed in claim 2 further including a safe load indicator which is operable to generate a reference signal representative of the maximum safe load which the crane can carry, means for comparing the output signal of the dynamometer with said reference signal, and an alarm device to provide an indication when the maximum safe load is exceeded.

10. A load weighing device as claimed in claim 9 wherein said safe load indicator includes means for sensing the angle of the crane jib to thereby modify said reference signal in accordance therewith.

11. A load weighing device as claimed in claim 10 wherein said angle sensing means comprises a cam box housing a cam having a follower connected to rotate the spindle of a potentiometer so that the reference electrical output signal from the potentiometer is repesentative, by its amplitude, of the position of the cam follower, as determined by the rotation of the cam, and means for causing said cam to rotate with movement of the jib of the crane.

12. A load weighing device as claimed in claim 11, for a variable-length jib crane, wherein the safe load indicator further includes means for sensing the length of the crane jib to thereby modify said reference signal in accordance with a computation of jib angle and jib length.

13. A load weighing device as claimed in claim 11, wherein the safe load indicator includes means for selectively modifying the reference signal in accordance with the conditions of use of the crane at any particular time.

14. A load weighing device as claimed in claim 13 wherein said cam is formed with a plurality of separate cam profiles, each having an associated follower and potentiometer, and wherein said modifying means includes switch means for selecting one particular potentiometer output signal in accordance with the conditions of use of the crane.

15. A load weighing device as claimed in claim 12 wherein the cam is elongate in the direction of its axis of rotation and means are provided for causing relative movement between the cam follower and the cam along this axis in accordance with jib length or jib angle, and wherein the cam profile is cut in three dimensions: angularly and axially to represent two of the three functions of jib length, jib angle or a combination of the two, and radially to represent the maximum safe load.

16. A load weighing device as claimed in claim 9 further including means for sensing the orientation of the crane and for reducing the safe load reading given by the indicator when the crane is inclined with the jib on the downhill side, but maintaining the safe load reading when the crane is inclined with the jib on the uphill side.

17. A load weighing device as claimed in claim 16 further comprising a safe load indicator operable to generate a reference signal representative of the maximum safe load which the crane can carry, said safe load indicator having a means for sensing the angle of the crane jib, said angle sensing means comprising a cam box housing a cam having a follower connected to rotate the spindle of a potentiometer so that the reference electrical output signal from the potentiometer is representative by its amplitude, of the position of the cam follower, as determined by the rotation of the cam, and means for causing said cam to rotate with movement of the jib of the crane and wherein said means for sensing the orientation of the crane includes a pendulum connected for rotation with said cam, and wherein said means for causing the cam to rotate with movement of the jib includes a peg mounted for movement with the jib, said peg protruding through an aperture in the pendulum so that movement of the peg is able to rotate the pendulum, said aperture being larger than the peg so that a degree of lost motion exists between the peg and the pendulum.

18. A load weighing device as claimed in claim 16 wherein said means for sensing the orientation of the crane includes a pendulum mounted for rotation on the crane superstructure, means connecting said pendulum to the spindle of a potentiometer such that the angular position of the pendulum relative to the superstructure is represented as the resistance of the potentiometer.

19. A load weighing device as claimed in claim 18 wherein two pendulums and associated potentiometers are provided: one pendulum mounted to sense forwards/backwards inclination of the crane; the other pendulum mounted to sense sidewards inclination of the crane.

20. A load weighing device as claimed in claim 18 wherein the pendulum is mounted on a backplate, which backplate is mounted on the crane superstructure for free rotation about a vertical axis, and wherein means are provided for sensing the angular position of the backplate about its vertical axis.

* * * * *